United States Patent
Winter

(10) Patent No.: US 10,900,236 B2
(45) Date of Patent: Jan. 26, 2021

(54) HANDRAIL ADJUSTABILITY BRACKET

(71) Applicant: Homecare Products, Inc., Algona, WA (US)

(72) Inventor: Ronald S. Winter, Pacific, WA (US)

(73) Assignee: Homecare Products, Inc., Algona, WA (US)

( * ) Notice: Subject to any disclaimer, the term of this patent is extended or adjusted under 35 U.S.C. 154(b) by 0 days.

(21) Appl. No.: 16/250,329

(22) Filed: Jan. 17, 2019

(65) Prior Publication Data

US 2019/0218787 A1    Jul. 18, 2019

Related U.S. Application Data

(60) Provisional application No. 62/618,396, filed on Jan. 17, 2018.

(51) Int. Cl.
*E04F 11/18* (2006.01)
*E04F 11/00* (2006.01)
*F16M 13/02* (2006.01)

(52) U.S. Cl.
CPC ........ *E04F 11/1834* (2013.01); *E04F 11/002* (2013.01); *E04F 11/1836* (2013.01); *F16M 13/02* (2013.01); *E04F 2011/1821* (2013.01)

(58) Field of Classification Search
CPC ..... E04F 11/002; E04F 11/02; E04F 11/1834; E04F 11/1836; E04F 2011/1821; E04F 2011/007; E04F 11/17; E04F 11/112; E04F 11/18
See application file for complete search history.

(56) References Cited

U.S. PATENT DOCUMENTS

| | | | | |
|---|---|---|---|---|
| 3,306,585 A | * | 2/1967 | Blum | E04F 11/1838 256/69 |
| 3,372,909 A | * | 3/1968 | Attaway | E04F 11/181 256/69 |
| 4,102,529 A | * | 7/1978 | Neblung | E04F 11/181 256/70 |
| 4,650,164 A | * | 3/1987 | Shepherd | E04F 11/1804 256/65.16 |
| 5,141,207 A | * | 8/1992 | Meglino | E04F 11/18 256/1 |
| 5,437,433 A | * | 8/1995 | Rezek | E04F 11/1834 256/59 |
| 5,584,469 A | * | 12/1996 | Goodwin | E04F 11/1834 256/67 |
| 6,145,814 A | * | 11/2000 | Perrot | E04F 11/1834 256/59 |
| 7,044,450 B2 | * | 5/2006 | Striebel | E04F 11/1812 256/65.16 |
| 7,540,472 B2 | * | 6/2009 | Striebel | E04F 11/1812 256/65.07 |

(Continued)

*Primary Examiner* — Abigail A Risic
(74) *Attorney, Agent, or Firm* — Polsinelli PC

(57) ABSTRACT

A handrail bracket for coupling a handrail to a portion of a ramp and/or platform assembly includes a first portion for coupling to a handrail system, and a second portion for supporting the handrail, the second portion being adjustably coupled to the first portion. A ramp and/or platform assembly includes a handrail system coupled to the decking system at an interface, wherein the handrail system includes a pivoting bracket for adjustable handrail alignment to substantially align a handrail with the grade of the decking system.

9 Claims, 7 Drawing Sheets

(56) References Cited

U.S. PATENT DOCUMENTS

| | | | | |
|---|---|---|---|---|
| 8,191,193 | B2* | 6/2012 | Bailie | B65G 69/30 |
| | | | | 14/69.5 |
| 8,844,083 | B2* | 9/2014 | McGivern | E04F 11/002 |
| | | | | 14/69.5 |
| 9,169,651 | B1* | 10/2015 | Wynne | E04F 11/1834 |
| 9,840,848 | B2* | 12/2017 | Cleavenger, II | E04F 11/1817 |
| 2003/0164488 | A1* | 9/2003 | Terrels | E04F 11/002 |
| | | | | 256/65.15 |
| 2003/0213948 | A1* | 11/2003 | Striebel | E04F 11/1812 |
| | | | | 256/67 |
| 2011/0017969 | A1* | 1/2011 | Reich | E04F 11/1836 |
| | | | | 256/65.16 |
| 2012/0005973 | A1* | 1/2012 | Bishop | E04F 11/18 |
| | | | | 52/184 |
| 2013/0153844 | A1* | 6/2013 | Burt | E04F 11/18 |
| | | | | 256/65.01 |
| 2014/0150188 | A1* | 6/2014 | Allen | E04F 11/002 |
| | | | | 14/69.5 |
| 2014/0191175 | A1* | 7/2014 | Bertato | E04H 17/16 |
| | | | | 256/31 |
| 2017/0268236 | A1* | 9/2017 | Cleavenger, II | E04F 11/1817 |
| 2018/0223538 | A1* | 8/2018 | Loh | E04F 11/1834 |

\* cited by examiner

HANDRAIL ADJUSTABILITY BRACKET

CROSS-REFERENCE TO RELATED APPLICATION

This application claims the benefit of U.S. Provisional Application No. 62/618,396 filed Jan. 17, 2018, the disclosure of which is hereby expressly incorporated by reference herein in its entirety.

BACKGROUND

Ramps and platforms are becoming increasingly common, due primarily to the recent passage of the Americans with Disabilities Act (ADA) requiring public buildings to be designed or modified to provide wheel chair access. These ramps and platforms assist those people confined to wheelchairs or who use walkers by providing a suitable pathway or rampway to the entrances of public and private buildings and stores, which may be at elevations above or below ground level. Because each site may be generally different from other sites, there is a need for ramp and platform assemblies that are modular in construction, and designed to minimize the cost and assembly time of at-site assembly.

Modular ramp and platform assemblies generally include deck surfaces, support posts, and handrails. These modular assemblies can be configured to provide ramping and horizontal deck surfaces to provide access, for example, if a user needs to travel from elevation A to elevation B, but is not able to traverse stairs or a steep slope to get there.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a ramp and/or platform assembly is provided. The ramp and/or platform assembly includes: a decking system having a grade; a handrail system coupled to the decking system at an interface, wherein the handrail system includes a pivoting bracket for adjustable handrail alignment to substantially align a handrail with the grade of the decking system; and a support system coupled to the interface to provide support to the decking system and the handrail system.

In accordance with another embodiment of the present disclosure, a handrail bracket for coupling a handrail to a portion of a ramp and/or platform assembly is provided. The handrail bracket includes: a first portion for coupling to a handrail system; and a second portion for supporting the handrail, the second portion being adjustably coupled to the first portion.

In any of the embodiments described herein, the handrail system may include a plurality of handrail posts.

In any of the embodiments described herein, the pivoting bracket may include a first portion for coupling to a handrail post of the handrail system, and a second portion for supporting the handrail, the second portion being adjustably coupled to the first portion

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following description sets forth one or more examples of a ramp and/or platform assembly and components thereof. Generally, embodiments described herein relate to modular ramp and platform assemblies that may include deck surfaces, support posts, and handrails. Additional embodiments relate to interfaces between components of the platform assembly, including, for example, the interface between the ramp section and the deck or platform section, the interface between the platform support posts and the handrail posts, etc.

As described in greater detail below, many of the components of the ramp and platform assembly may be formed from metal, for example, from extruded aluminum. Extruded aluminum construction generally reduces parts in the overall system, thereby reducing manufacturing and assembly costs, as well as operational noise generated by rattling part couplings. Moreover, extruded aluminum parts can be designed to achieve the same strength and stiffness requirements as steel construction, while having reduced weight over steel parts or parts made from other materials, allowing for improved ease of assembly and optimized part design.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. It will be appreciated that embodiments of the present disclosure may employ any combination of features described herein.

Figure 1:
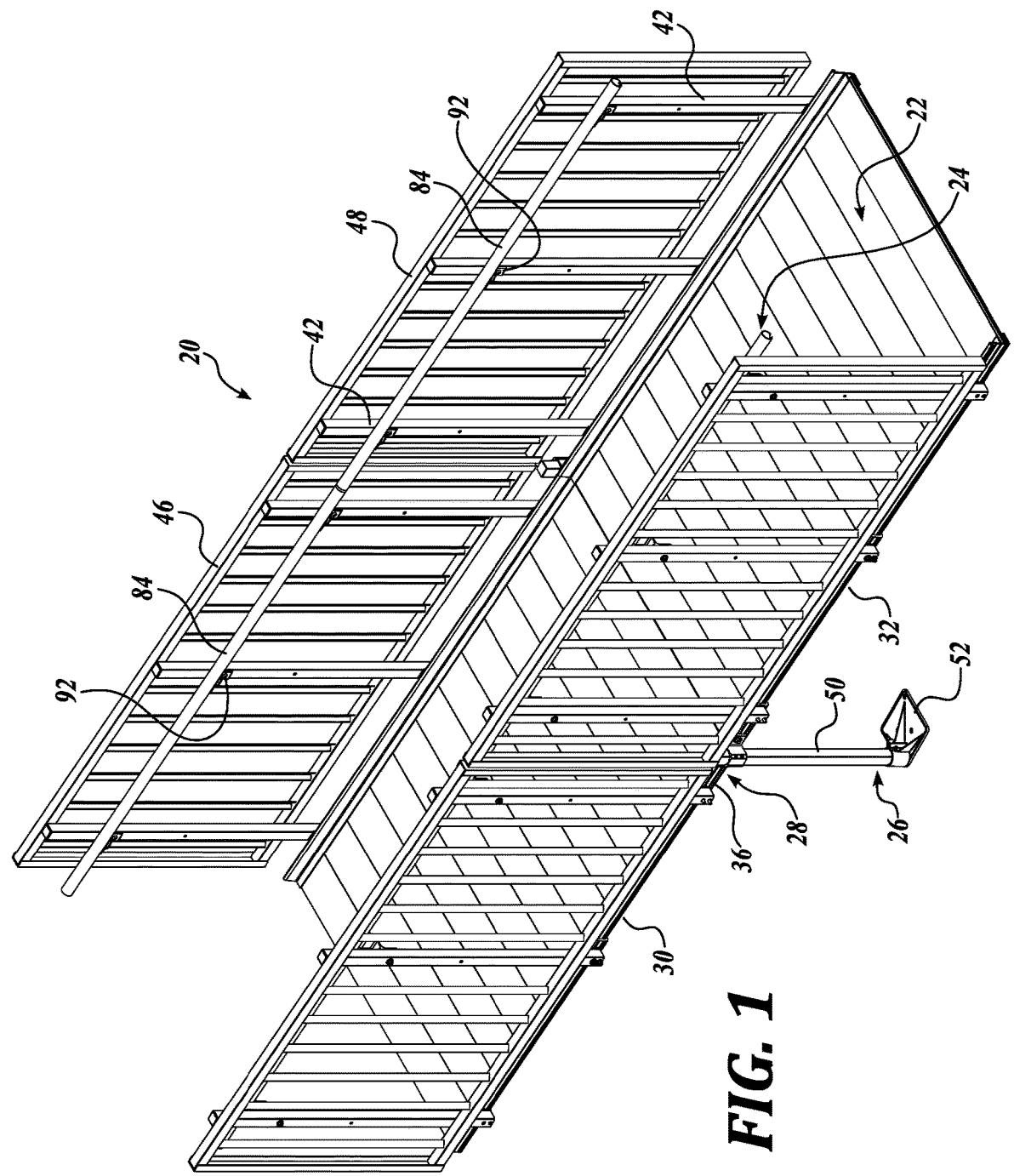
FIG. 1 is an isometric view of a ramp and/or platform assembly in accordance with one embodiment of the present disclosure.

FIG. 1 illustrates an example of a ramp and/or platform assembly, generally designated 20, formed in accordance with aspects of the present disclosure. In the embodiment shown in FIG. 1, the ramp and/or platform assembly 20 includes a decking system 22, a handrail system 24 configured to couple with the decking system 22, and a support system 26 configured to couple with the decking system 22. As a free-standing assembly, a ramp and/or platform assembly 20 in accordance with one embodiment of the present disclosure further includes several interfaces between the components of the handrail system 24, the support system 26, and the decking system 22.

In accordance with ADA requirements, the grade of a ramp must be within a certain rise to run ratio (for example, less than or equal to 1:12). Moreover, if the rise to run ratio is greater than 1:12, handrails are required on each side of the ramp. The rise to run ratio may vary for ramping deck surfaces depending on the rise and the distance between the desired high and low elevation points of the ramp. Therefore, adjustable interfaces are needed to adjust handrail system 24 to properly couple with the decking system 22.

Still referring to FIG. 1, the decking system 22 provides a traversing surface for the user of the ramp and/or platform assembly 20. In that regard, the decking system may include multiple platforms, such as first and second platforms 30 and 32, which may be adjoined by one or more saddle brackets 34.

The support system 26 includes legs 50 and feet 52 to support the ramp and/or platform assembly 20 with the legs 50 positioned generally normal to a supporting surface, which will be generally referred to as a ground surface. The support system 26 is coupled to the decking system 22 at an angle. Because the grade of the decking system 22 is not always consistent, and because the ground surface may or may not be level at all locations of support, adjustability at the site of assembly is needed in the attachment of the support system 26 to the decking system 22.

Figure 2:
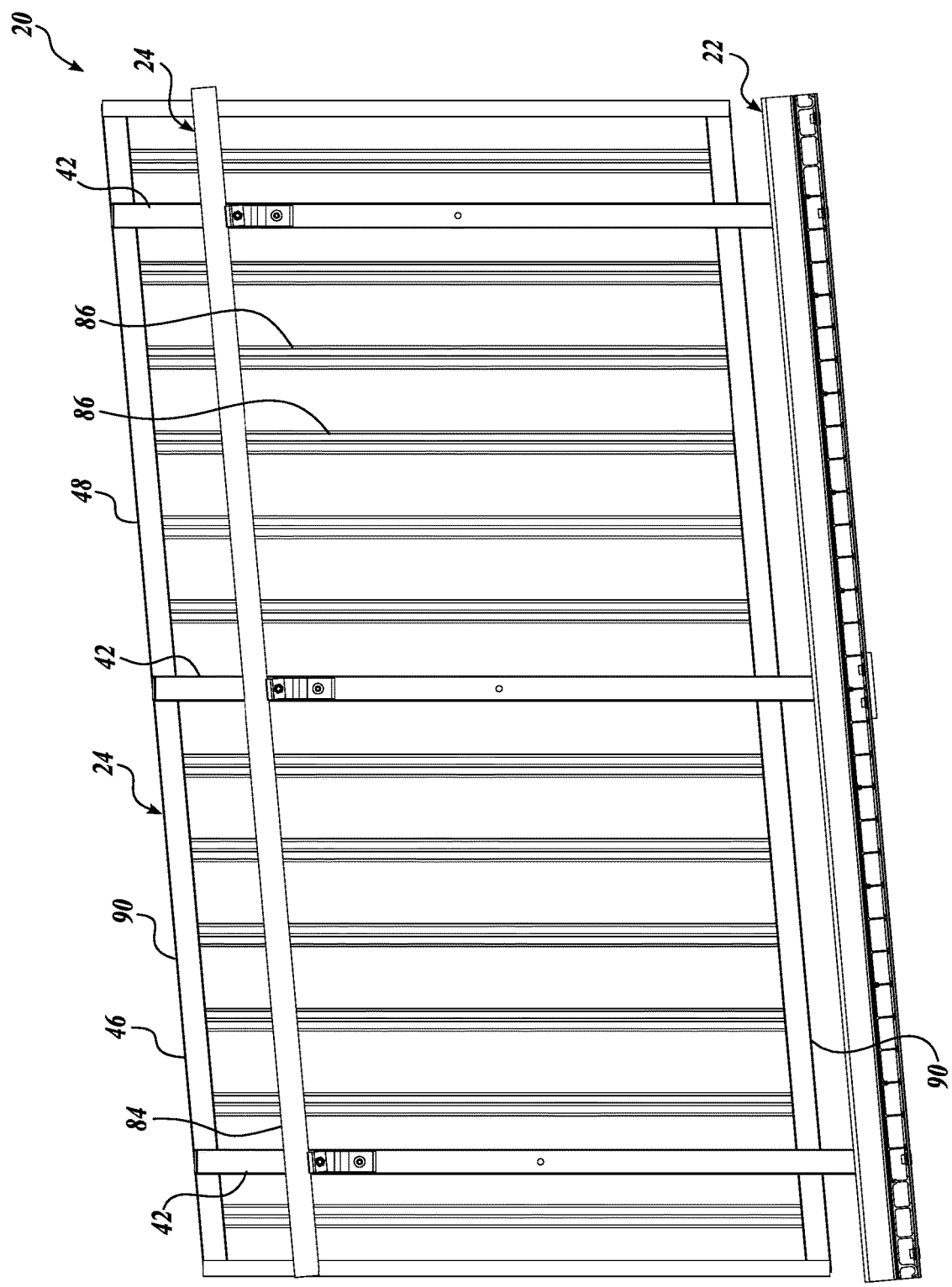
FIG. 2 is a close-up, isometric view of a handrail bracket in accordance with embodiments of the present disclosure.

In most ramp assemblies, the handrail system 24 is coupled to the decking system 22 at the same grade as the decking system 22. In the illustrated embodiment, picket sections 46 and 48 including handrail support posts 42 are coupled to the decking system 22. The handrail posts 42 are generally oriented to be normal to a ground surface and therefore are oriented at an angle to a ramping decking system 22 (see FIG. 2). However, the "horizontal" portions of the picket sections 46 and 48 are substantially parallel to the decking system 22. Parallel parts of the picket sections 46 and 48 and the decking system 22 provide consistent picket and handrail height and support to a user of the ramp and/or platform assembly 20.

Although described as "horizontal" portions of the picket sections 46 and 48, the horizontal handrails are designed to be sloped according to the grade of the decking section 20.

Handrail systems 24 in accordance with embodiments of the present disclosure may include a plurality of pickets or guardrails 86 for safety, whether oriented in a horizontal or vertical configuration. In the illustrated embodiment of FIG. 2, the pickets 86 are oriented in a vertical orientation between vertical handrail support posts 42. Top and bottom primary picket supports 90 are coupled to the pickets 84 in each picket section 46 and 48. A horizontal handrail 84 attached to the handrail support posts 42 provides continuous handrail access to the user of the ramp and/or platform assembly 20.

Figure 5:
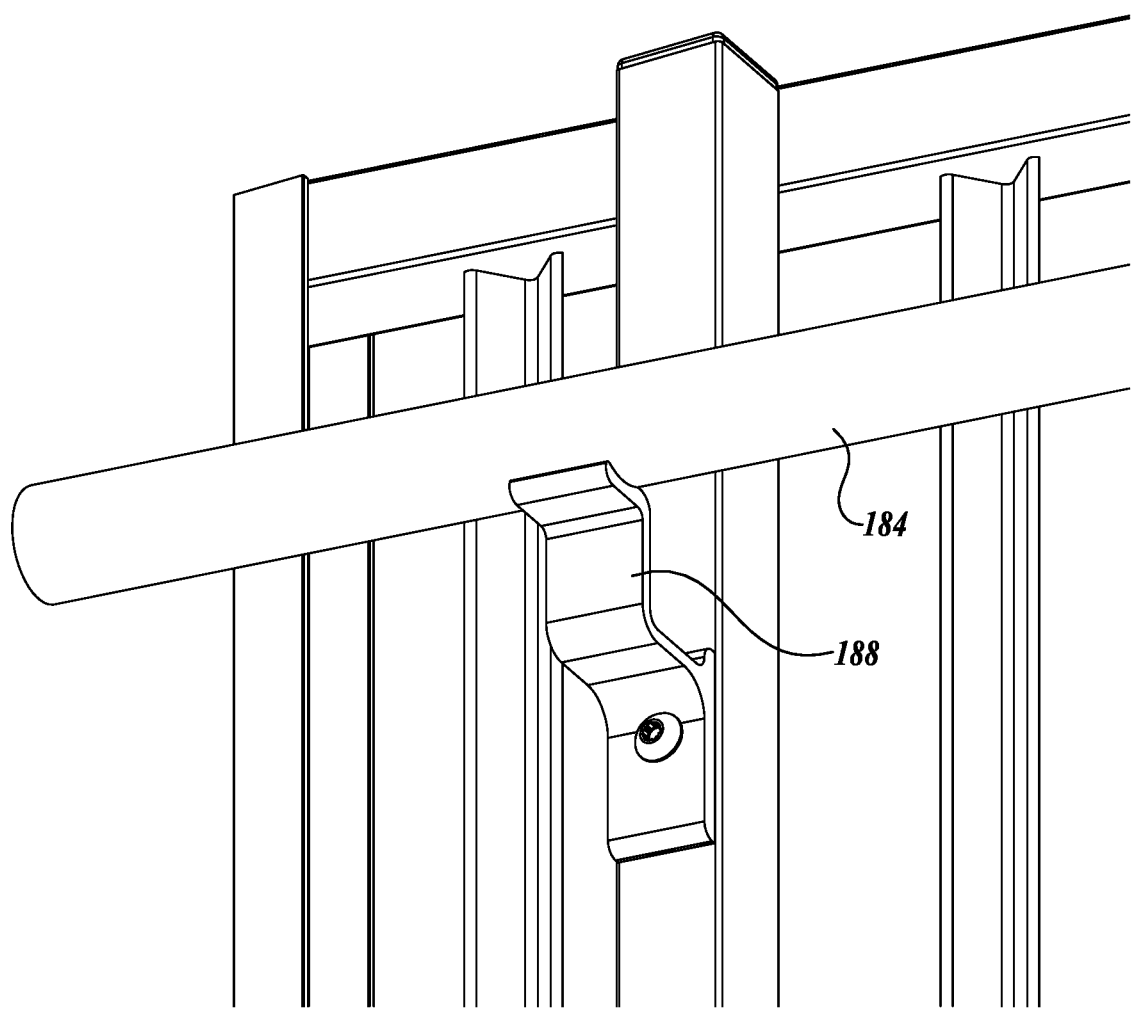
FIGS. 5-7 are perspective and side view of a previously-developed handrail bracket in a modular ramp and/or platform assembly.
Figure 6:
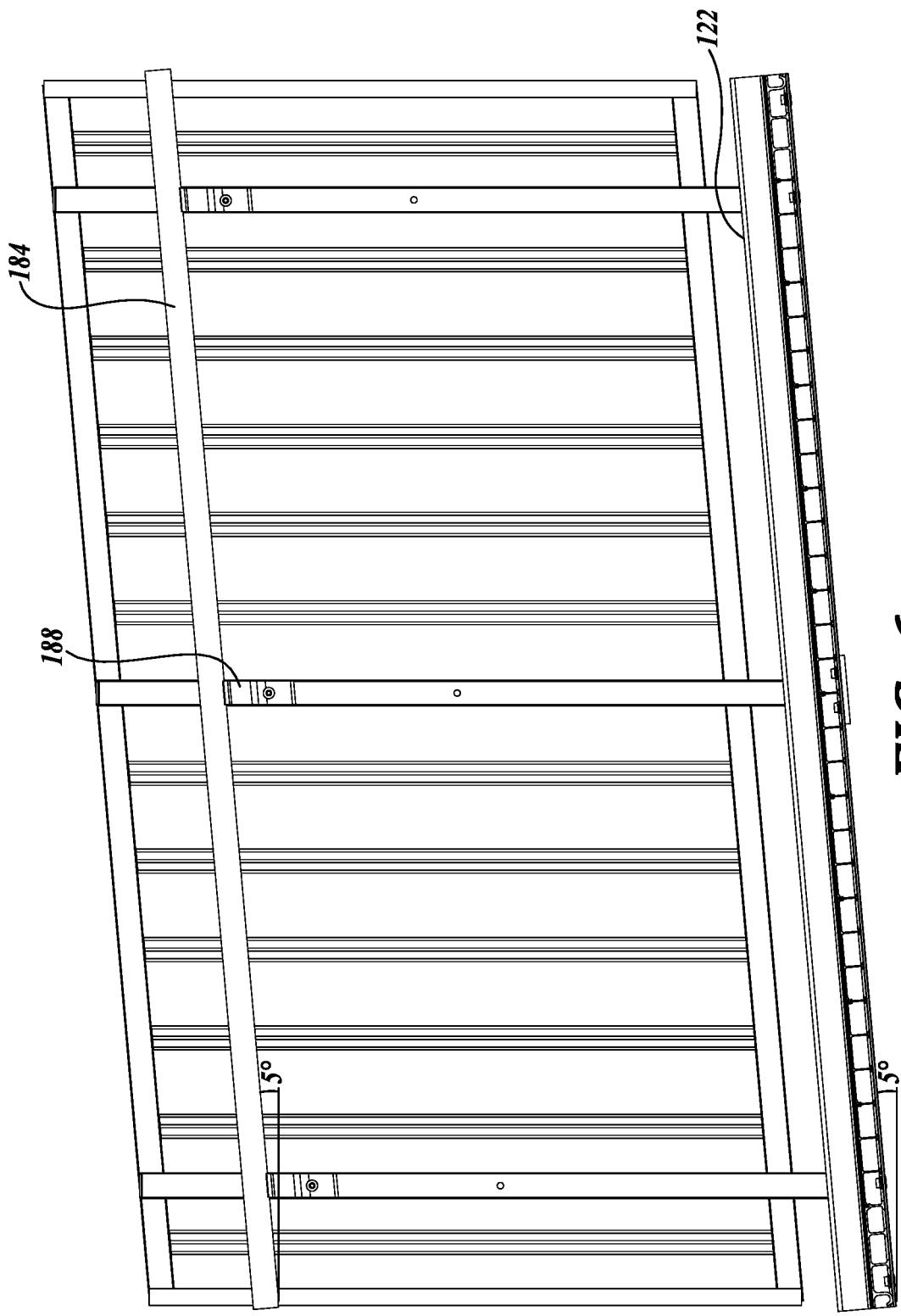
Figure 7:
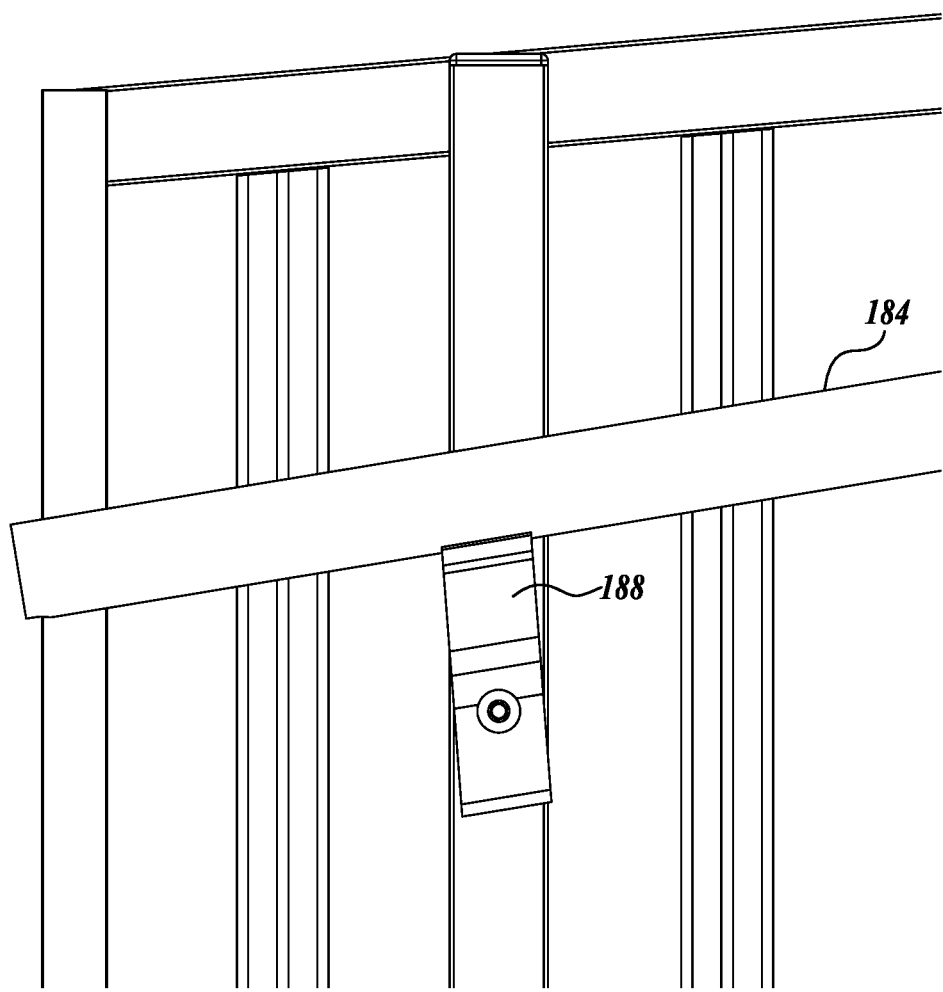

In previously developed systems, parallel handrails and decking on a ramp were achieved using a non-adjustable handrail bracket 188 (see FIGS. 5-7). The handrail bracket 188 was designed and configured to support a handrail 184 at a specific generally-used angle. For example, the handrail bracket 188 may have been designed and configured to support the handrail at a 5 degree grade to align with a 5 degree grade decking system.

As can be seen in FIG. 6, when both the handrail 184 and the decking system 122 are set at the specified angle, for example, 5 degrees, the parallel handrails 184 and decking 122 provide consistent handrail height and support to a user of the ramp and/or platform assembly.

Oftentimes, however, the grade of the decking system 122 is not in alignment with the set angle of the handrail bracket 188. In these situations, two problems generally arise. First, the handrail 184 and the decking system 122 are not parallel and appear to either converge together or diverge from each other as the user observes the ramp and/or platform assembly 20. Not only does the non-parallel appearance affect the aesthetics of the ramp and/or platform assembly 120, but it can also create handrail variability and support problems for a user of the ramp and/or platform assembly 120.

Second, and more commonly, the handrail bracket 188 may be offset in its attachment (as seen in FIG. 7) to accommodate the different in the grade of the decking system 122 as compared to the set angle of the handrail bracket 188. Not only does the offset orientation of the handrail brackets 188 affect the aesthetics of the ramp and/or platform assembly 120, but offset handrail brackets 188 can also create a snag hazard for a user of the ramp and/or platform assembly 120.

Figure 3:
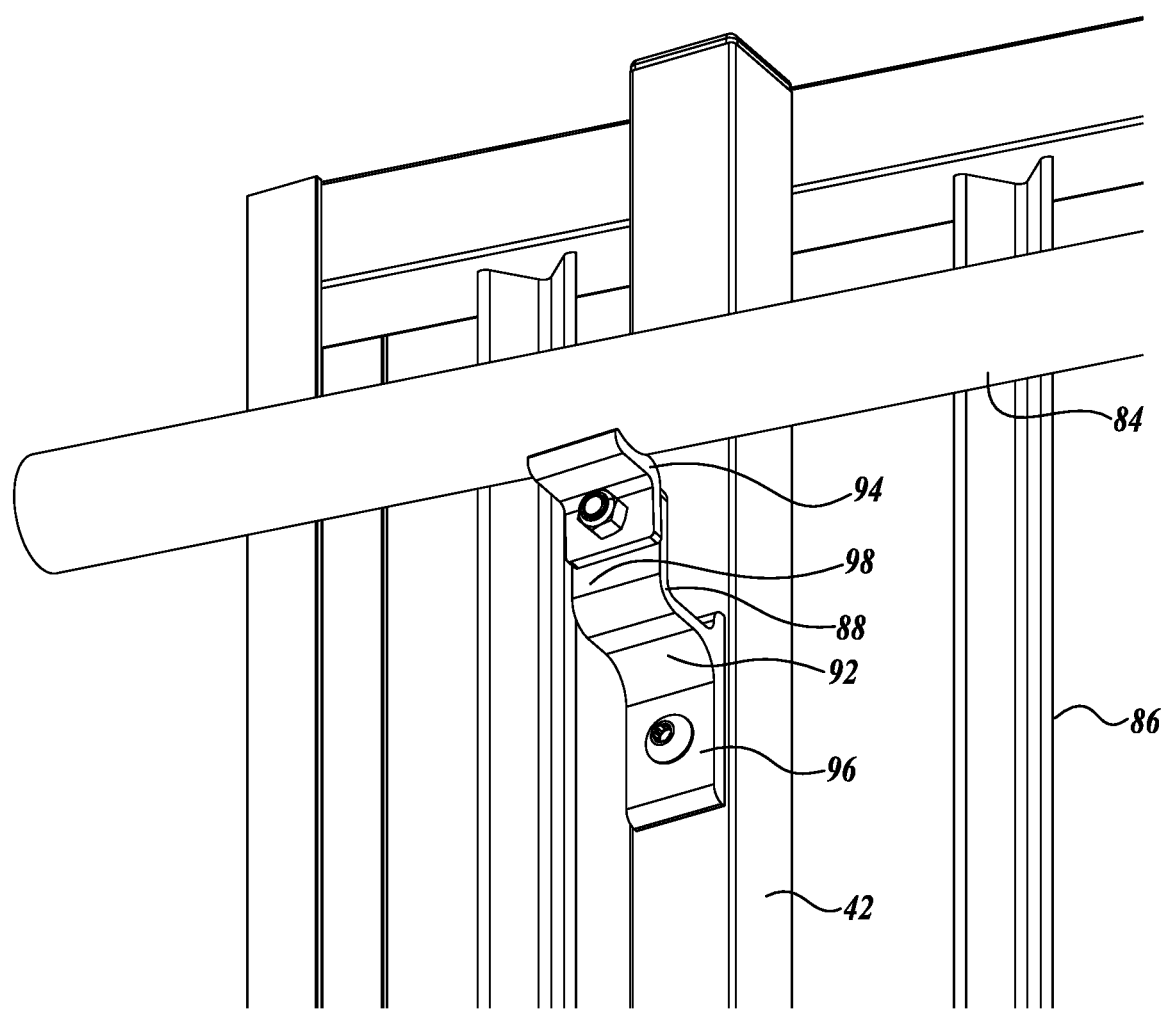
FIG. 3 is a side view of a handrail bracket of FIG. 1 in a ramp and/or platform assembly in accordance with embodiments of the present disclosure.
Figure 4:
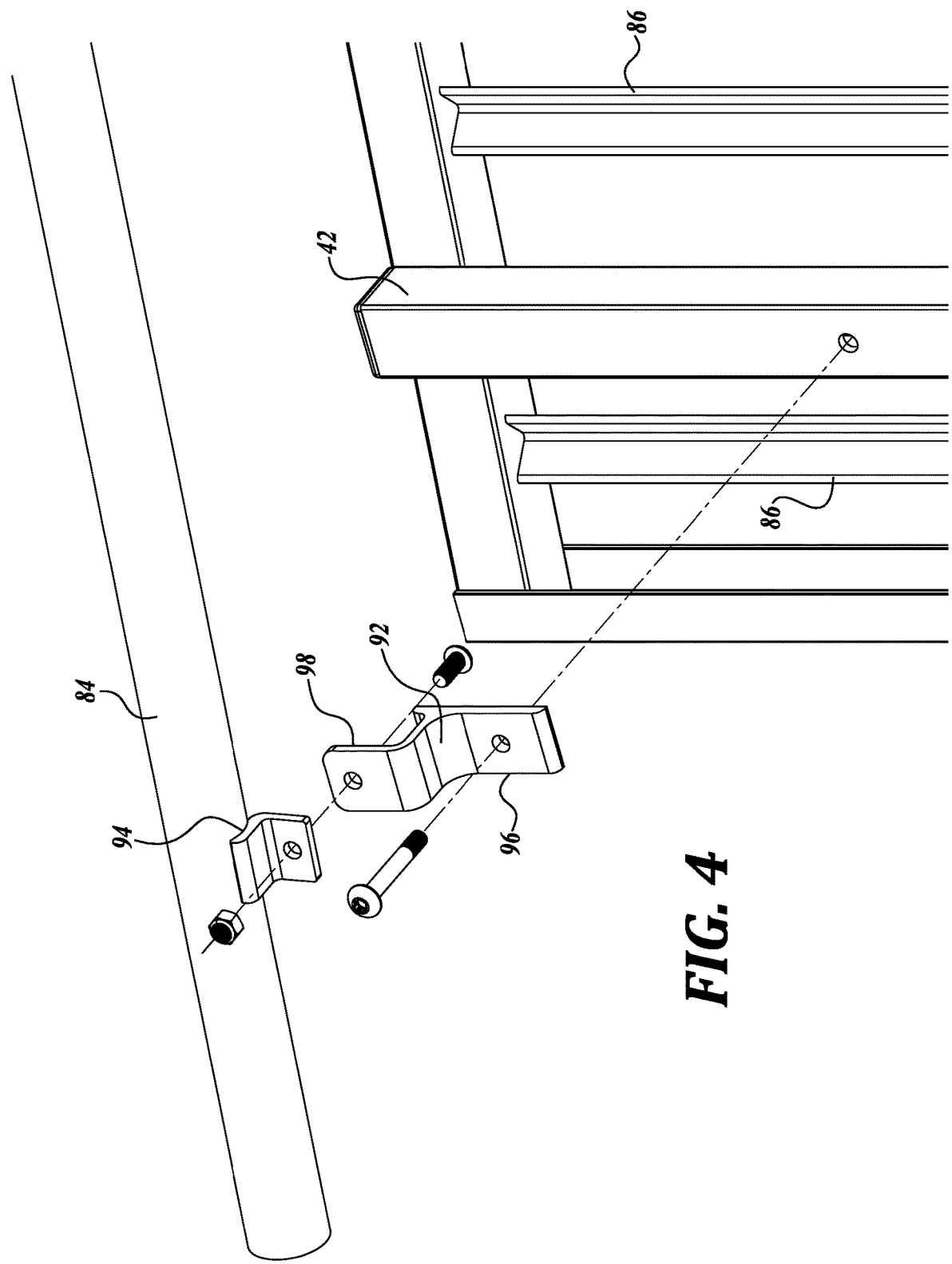
FIG. 4 is an exploded view of the handrail bracket of FIG. 1 in a ramp and/or platform assembly in accordance with embodiments of the present disclosure.

Referring now to FIGS. 3 and 4, in accordance with embodiments of the present disclosure, a handrail bracket 88 for coupling a handrail 84 to the handrail system 24 includes a first portion 92 and a second portion 94, with the second portion 94 being adjustably couplable to the first portion 92.

The first portion 92 includes a base 96 for fastener attachment to a handrail support post 42 of the handrail system 24. In the illustrated embodiment, the base 96 includes a planar surface to align with the planar surface of the handrail post 42. However, contoured surfaces are also within the scope of the present disclosure depending on the shape of the handrail post 42 to which the first portion 92 is coupling.

The first portion 92 further includes an extending portion 98 for outward extension from the handrail post 42 to provide spacing between the handrail posts 42 and pickets 86. Such spacing allows for the user's hand to travel along the handrail 84 without running into other components of the handrail system 24.

The second portion 94 of the handrail bracket 88 is configured for adjustable attachment with the first portion 92 and for supporting the handrail 84. In the illustrated embodiment, the adjustable attachment is a fastener attachment which may be adjusted at any angle without affecting the coupling of the first portion 92 of the handrail bracket 88 to the handrail post 42. However, other adjustable attachment systems besides a fastener attachment are within the scope of the present disclosure.

The second portion 94 is configured to provide underside support to the handrail 84. Such underside support allows for the user's hand to travel along the handrail 84 without running into components of the handrail bracket 88.

In accordance with embodiments of the present disclosure, the second portions 94 of the handrail brackets may be delivered pre-welded to sections of the handrail 84 at appropriate spacing (see FIG. 4). Therefore, during assembly of the ramp and/or platform assembly 20, no welding is required for the attachment of the handrail 84 to the ramp and/or platform assembly 20.

One advantageous effect of the adjustable handrail bracket 88 is the capability for alignment of the grade of the handrail 84 with the grade of the decking system 22 in custom grade ramps.

Another advantageous effect of the adjustable handrail bracket 88 is that snags can be prevented when the handrail bracket is offset to accommodate custom grade ramps. (See an offset handrail bracket 188 in FIG. 7.)

Yet another advantageous effect of the weldability of the adjustable handrail bracket 88 is that the second portions 94 of the handrail bracket 88 can be pre-welded to sections of the handrail 84 for ease of installation. When the previously designed handrail bracket 188 (see FIG. 5) was pre-welded to sections of the handrail 184, there were many part defects because the handrail bracket 188 had to be welded at an angle of 5 degrees, which often was welded in error. Moreover, the handrail bracket 188 tended to break away from the handrail 184 during shipping or installation. In contrast, the second portion 94 of the handrail bracket 88 of the present disclosure is smaller in profile and therefore less likely to break away from the handrail 84 during shipping or installation. Moreover, the second portion 94 of the handrail bracket 88 of the present disclosure can be welded at an exact 90-degree angle to the handrail 84 to reduce welding errors.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the disclosure in which an exclusive property or privilege is claimed are defined as follows:

1. A ramp and/or platform assembly, comprising:
   a decking system having a grade and a handrail coupling interface, wherein the handrail coupling interface includes a handrail support post; and
   a handrail system configured to couple to the handrail support post of the decking system, wherein the handrail system includes a handrail and a pivoting bracket for adjustable handrail alignment configurable to substantially align the handrail with the grade of the decking system, the pivoting bracket including:
   a first portion configured to attach to the handrail support post, the first portion including a base configured for attachment to the handrail support post and an extension distal from the handrail support post, wherein the extension includes a first section configured for extending laterally from the handrail support post and a second section coupled to the first section configured for extending vertically from the first section parallel to the handrail support post; and
   a second portion configured for pivotable attachment with the extension of the first portion, wherein the second portion includes a first section configured to attach only to an underside external surface of the handrail and a second section coupled to the first section and configured to pivotably attach with the first component of the first portion.

2. The ramp and/or platform assembly of claim 1, wherein the handrail system includes a plurality of handrail posts and a plurality of pivoting brackets configured to support the handrail.

3. A handrail system for coupling a handrail to a decking system of a ramp and/or platform assembly, the decking system having a grade and a handrail coupling interface, wherein the handrail coupling interface includes a handrail support post, the handrail system comprising:
   a handrail; and
   a pivoting bracket configurable to substantially align the handrail with the grade of the decking system, the pivoting bracket including a first portion configured to attach to the handrail support post, the first portion including a base configured for attachment to the handrail support post and an extension distal from the handrail support post, wherein the extension includes a first section configured for extending laterally from the handrail support post and a second section coupled to the first component configured for extending vertically from the first section parallel to the handrail support post, and a second portion configured for pivotable attachment with the extension of the first portion, wherein the second portion includes a first section configured to attach only to an underside external surface of the handrail and a second section coupled to the first section and configured to pivotably attach with the first component of the first portion.

4. The handrail system of claim 3, wherein the second portion is welded to the underside of the handrail.

5. The ramp and/or platform assembly of claim 1, further comprising a support system coupled to the decking system to provide support to the decking system and the handrail system.

6. A ramp and/or platform assembly, comprising:
   a decking system having a grade; and
   a handrail system coupled to the decking system at an interface, wherein the interface includes a handrail support post, wherein the handrail system includes a handrail and a pivoting bracket for adjustable handrail alignment configurable to substantially align the handrail with the grade of the decking system, the pivoting bracket including a first portion configured to attach to the handrail support post, the first portion including a base configured for attachment to the handrail support post and an extension distal from the handrail support post, wherein the extension includes a first section configured for extending laterally from the handrail support post and a second section coupled to the first section configured for extending vertically from the first section, and a second portion configured for pivotable attachment with the extension of the first portion, wherein the second portion is welded to an outer surface of the underside of the handrail.

7. A ramp and/or platform assembly of claim 1, wherein the second section of the extension of the first portion of the pivoting bracket is oriented substantially perpendicular to the first section of the extension of the first portion of the pivoting bracket.

8. A ramp and/or platform assembly of claim 1, wherein the second section of the second portion of the pivoting bracket is oriented substantially perpendicular to the first section of the second portion of the pivoting bracket.

9. A ramp and/or platform assembly of claim 1, wherein the second section of the second portion of the pivoting bracket defines a planar surface and wherein the second section of the second portion of the pivoting bracket defines a planar surface and wherein, when the first and second portions of the pivoting bracket are coupled, the planar surfaces are adjacent each other.

\* \* \* \* \*